(12) United States Patent
Kremer et al.

(10) Patent No.: US 11,953,801 B2
(45) Date of Patent: Apr. 9, 2024

(54) SOLID-STATE TIP-TILT-PHASED ARRAY

(71) Applicant: HRL Laboratories, LLC, Malibu, CA (US)

(72) Inventors: Richard Kremer, Ramona, CA (US);
Kyung-Ah Son, Moorpark, CA (US);
Jeong-Sun Moon, Moorpark, CA (US);
Ryan Quarfoth, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 124 days.

(21) Appl. No.: 17/206,756

(22) Filed: Mar. 19, 2021

(65) Prior Publication Data
US 2021/0364881 A1    Nov. 25, 2021

Related U.S. Application Data

(60) Provisional application No. 63/027,841, filed on May 20, 2020, provisional application No. 63/027,838,
(Continued)

(51) Int. Cl.
*G02F 1/29*    (2006.01)
*G02B 27/00*   (2006.01)
(Continued)

(52) U.S. Cl.
CPC ......... *G02F 1/292* (2013.01); *G02B 27/0087* (2013.01); *G02F 1/0147* (2013.01);
(Continued)

(58) Field of Classification Search
CPC ............... G02F 1/29; G02F 1/292; G02F 1/03
See application file for complete search history.

(56) References Cited

U.S. PATENT DOCUMENTS

| 4,466,703 A | 8/1984 | Nishimoto |
| 6,373,620 B1 * | 4/2002 | Wang ...................... G02F 1/292 359/317 |

(Continued)

FOREIGN PATENT DOCUMENTS

| CN | 106480413 A | 3/2017 |
| CN | 106756793 A | 5/2017 |

(Continued)

OTHER PUBLICATIONS

From U.S. Appl. No. 17/190,031 (now published as US 2021/0364884) Notice of Allowance dated Feb. 11, 2022.
(Continued)

*Primary Examiner* — Jessica M Merlin
(74) *Attorney, Agent, or Firm* — Ladas & Parry, LLP

(57) ABSTRACT

A solid state optical beam steering device including a body of electro-optical material wherein the body of electro-optical material comprises any material of a class of hydrogen-doped phase-change metal oxide and wherein the body has a first face and a second face opposite the first face, a first transparent resistive sheet on the first face of the body of electro optic material, wherein the first transparent resistive sheet has a first side and a second side, and a transparent conductor on the second face of the body of electro optic material, wherein the transparent conductor is coupled to the second side of the first transparent resistive sheet.

26 Claims, 12 Drawing Sheets

Related U.S. Application Data filed on May 20, 2020, provisional application No. 63/027,847, filed on May 20, 2020, provisional application No. 63/027,844, filed on May 20, 2020, provisional application No. 63/027,849, filed on May 20, 2020.

(51) Int. Cl.
*G02F 1/01* (2006.01)
*G02F 1/03* (2006.01)

(52) U.S. Cl.
CPC .............. *G02F 1/03* (2013.01); *G02F 1/0316* (2013.01); *G02F 1/294* (2021.01); *G02F 2201/122* (2013.01); *G02F 2202/06* (2013.01); *G02F 2203/24* (2013.01)

(56) References Cited

U.S. PATENT DOCUMENTS

| | | |
|---|---|---|
| 7,087,882 B1 | 8/2006 | Dries |
| 7,312,917 B2 | 12/2007 | Jacob |
| 10,955,720 B2 | 3/2021 | Son |
| 2005/0014033 A1 | 1/2005 | Cheung et al. |
| 2006/0050358 A1 | 3/2006 | Bigman |
| 2007/0053139 A1 | 3/2007 | Zhang |
| 2007/0097370 A1 | 5/2007 | Chism |
| 2007/0171504 A1 | 7/2007 | Fujimori |
| 2008/0212007 A1 | 9/2008 | Meredith |
| 2010/0309539 A1 | 12/2010 | Kaye |
| 2011/0038093 A1 | 2/2011 | Furukawa |
| 2013/0063805 A1 | 3/2013 | Arnold |
| 2016/0170244 A1 | 6/2016 | Ho et al. |
| 2016/0266465 A1* | 9/2016 | Rastegar ................ G02F 1/292 |
| 2016/0284995 A1 | 9/2016 | Bajaj |
| 2017/0031231 A1 | 2/2017 | Bhaskaran |
| 2017/0054099 A1 | 2/2017 | Friend |
| 2017/0113951 A1 | 4/2017 | Su |
| 2018/0046056 A1 | 2/2018 | Na |
| 2018/0059440 A1* | 3/2018 | Yu ........................... G11C 11/56 |
| 2018/0158616 A1 | 6/2018 | Lazarev |
| 2019/0129275 A1 | 5/2019 | McManamon et al. |
| 2019/0278150 A1 | 9/2019 | Son |
| 2021/0363629 A1 | 11/2021 | Son |
| 2021/0364884 A1 | 11/2021 | Kremer |
| 2022/0389561 A1 | 12/2022 | Son |

FOREIGN PATENT DOCUMENTS

| | | | |
|---|---|---|---|
| JP | 2007-147934 | | 6/2007 |
| JP | 2016-050951 A | | 4/2016 |
| KR | 10-2019-0092062 A | | 8/2019 |
| KR | 20200029924 A | | 3/2020 |
| WO | WO-2011129979 A2 * | 10/2011 | ....... H01L 21/02422 |

OTHER PUBLICATIONS

U.S. Appl. No. 17/212,611, filed Mar. 25, 2021, Kremer, et al. (non-publication requested).
From U.S. Appl. No. 17/190,031 (now as US 2021-0364884 A1), Notice of Allowance dated Jan. 4, 2022.
From U.S. Appl. No. 17/190,031 (now as US 2021-0364884 A1), Office Action dated Sep. 30, 2021.
From U.S. Appl. No. 17/206,927 (now published as US 2021-0363629 A1), Office Action dated Dec. 1, 2021.
PCT International Search Report and Written Opinion from PCT/US2021/023265 dated Jul. 8, 2021.
PCT International Search Report and Written Opinion from PCT/US2021/020544 dated Jun. 23, 2021.
Boileau, A. et al. "Mechanisms of Oxidation of NdNiO 3-δ Thermochromic Thin Films Synthesized by a Two-Step Method in Soft Condition", The Journal of Physical Chemistry C, 2014, vol. 118, Iss. 11, pp. 5908-5917.
Neumann, B. et al. "Niobium-doped TiO2 films as window layer for chalcopyrite solar cells", Physica Status Solidi B, 2008, vol. 245, No. 9, pp. 1849-1857 (11 pages).
Phare, et al., "Silicon Optical Phased Array with High-Efficiency Beam Formation over 180 Degree Field of View" Department of Electrical Engineering, Columbia University, New York, NY 10027, USA, which may be found at arXiv:1802.04624, 2018.
From U.S. Appl. No. 17/206,927, Office Action dated Feb. 10, 2022.
U.S. Appl. No. 17/206,927, Son, filed Mar. 19, 2021.
U.S. Appl. No. 17/190,031, Kremer, filed Mar. 2, 2021.
U.S. Appl. No. 17/212,611, Son, filed Mar. 25, 2021.
From U.S. Appl. No. 16/296,049 (now published as U.S. Pat. No. 10,955,720), Notice of Allowance dated Nov. 24, 2020.
From U.S. Appl. No. 16/296,049 (now published as U.S. Pat. No. 10,955,720), Office Action dated Aug. 14, 2020.
PCT International Preliminary Report on Patentability (Chapter II) for PCT/US2019/021233 dated Sep. 25, 2019.
PCT International Search Report for PCT/US2019/021233 dated Jun. 26, 2019.
PCT Written Opinion of the International Searching Authority for PCT/US2019/021233 dated Jun. 26, 2019.
Chung, S., et al., "A Monolithically Integrated Large-Scale Optical Phased Array in Silicon-on-Insulator CMOS", IEEE Journal of Solid-State Circuits, vol. 53, Issue 1, pp. 275-296, Jan. 2018.
Ha, et al., "Examination of insulator regime conduction mechanisms in epitaxial and polycrystalline $SmNiO_3$ thin films", Journal of Applied Physics, 110, 094102 (2011).
Helmbrecht, et al., "Piston-tip-tilt positioning of a segmented MEMS deformable mirror," Proceedings of SPIE 6467, MEMS Adaptive Optics, 64670M (Feb. 9, 2007).
Li, Z., et al., "Correlated Perovskites as a New Platform for Super-Broadband-Tunable Photonics", Advanced Materials, 28, 9117-9125 (2016) and Supporting Information.
Mike Hanlon, "Eyeglasses with Adaptive Focus", New Atlas, Health and Well Being, Apr. 15, 2006, https://newatlas.com/eyeglasses-with-adaptive-focus/5516 (printed: Jun. 3, 2021).
Milanovic, V., et al., "Tip-tilt-piston Actuators for High Fill-Factor Micromirror Arrays", Solid-State Sensor, Actuator and Microsystems Workshop, Jun. 6-10, 2004, pp. 232-237, www.adriaticresearch.org/Research/pdf/HHH04.pdf.
Shi, et al., "Colossal resistance switching and band gap modulation in a perovskite nickelate by electron doping", Nature Communications 5, 4860 (2014) doi:10.1038/ncomms5860 (9 pages).
Wang, et al., "Micromirror Based Optical Phased Array for Wide-Angle Beamsteering", MEMS 2017, Las Vegas, NV, USA, Jan. 22-26, 2017.
Zewei Shao et al., 'Recent progress in the phase-transition mechanism and modulation of vanadium dioxide materials', NPG Asia Materials, Jul. 25, 2018, pp. 581-605 [Retrieved on May 27, 2021]. Retrieved from the Internet: <URL: https://www.nature.com/articles/s41427-018-0061-2>.
PCT International Search Report for PCT/US2021/023352 dated Jun. 22, 2021.
PCT Written Opinion of the International Searching Authority for PCT/US2021/023352 dated Jun. 22, 2021.
Shi et al., "A correlated nickelate synaptic transistor", Nature Communications, Oct. 31, 2013.
PCT international Preliminary Report on Patentability (Chapter II) from PCT/US2021/023352 dated May 19, 2022.
From U.S. Appl. No. 17/212,611 (unpublished, non-publication request filed), Office Action dated Jul. 13, 2023.
From U.S. Appl. No. 17/890,913 (now published as US 2022-0389561 A1), Office Action dated Dec. 5, 2023.
Oh et al. "Correlated memory resistor in epitaxial NdNiO3 heterostructures with asymmetrical proton concentration", Applied Physics Letters 108, 122106 (2016), pp. 122106-1-122106-5 (Year: 2016).
Qiao et al. "Effect of substrate temperature on the microstructure and transport properties of highly oriented (100)-oriented LaNiO3-sigma films by pure argon sputtering", Journal of Crystal Growth 310 (2008) pp. 3653-3658 (Year: 2008).

(56) References Cited

OTHER PUBLICATIONS

Zhao et al. "A study on the thermostability of LaNiO3 films", Surface & Coatings Technology, 192 (2005) pp. 336-340 (Year: 2005).

* cited by examiner

SOLID-STATE TIP-TILT-PHASED ARRAY

CROSS REFERENCE TO RELATED APPLICATIONS

This application is related to and claims the benefit of U.S. Provisional Patent Application Ser. No. 63/027,844, filed May 20, 2020, and entitled "Solid State Tip-Tilt Phased Array", which is hereby incorporated herein by reference.

This application is also related to and claims the benefit of U.S. Provisional Patent Application Ser. No. 63/027,841, filed May 20, 2020, and entitled "Solid-state Electrically-Variable Optical Wedge", which is hereby incorporated herein by reference.

This application is also related to and claims the benefit of U.S. Provisional Patent Application Ser. No. 63/027,838, filed May 20, 2020, and entitled "Solid State Electrically Variable-Focal Length Lens", which is hereby incorporated herein by reference.

This application is also related to and claims the benefit of U.S. Provisional Patent Application Ser. No. 63/027,847, filed May 20, 2020, and entitled "Method to Grow IR Optical Materials with Extremely Small Optical Loss", which is hereby incorporated herein by reference.

This application is also related to and claims the benefit of U.S. Provisional Patent Application Ser. No. 63/027,849, filed May 20, 2020, and entitled "Method to Grow Thick Crystalline Optical Films on Si Substrates", which is hereby incorporated herein by reference.

This application is also related to U.S. patent application Ser. No. 16/296,049, filed 7 Mar. 2019, and entitled "Electrically Reconfigurable Optical Apparatus Using Electric Field", which is hereby incorporated herein by reference.

This application is also related to U.S. Provisional Patent Application Ser. No. 63/094,756, filed 21 Oct. 2020 and entitled "Electric Field-Tunable IR Devices with Very Large Modulation of Refractive Index and Methods to Fabricate Them" (Disclosure 20200124, L&P ref. 632741-8), which is hereby incorporated herein by reference.

STATEMENT REGARDING FEDERAL FUNDING

None

TECHNICAL FIELD

This disclosure relates to optical beam steering.

BACKGROUND

In the prior art optical beam steering has been performed using an Optical Phased Array (OPA). Such a OPA is described in "A Monolithically Integrated Large-Scale Optical Phased Array in Silicon-on-Insulator CMOS", Chung, SungWon; Abediasl, Hooman; Hashemi, Hossein, IEEE Journal of Solid-State Circuits, vol. 53, issue 1, pp. 275-296, January 2018, which is incorporated herein by reference.

Optical beam steering has also been performed using a deformable mirror as described by Michael A. Helmbrecht and Thor Juneau, "Piston-tip-tilt positioning of a segmented MEMS deformable mirror," Proc. SPIE 6467, MEMS Adaptive Optics, 64670M (9 Feb. 2007), which is incorporated herein by reference.

A micro-electromechanical system (MEMS) is described by Youmin Wang, and Ming C. Wu*, "MICROMIRROR BASED OPTICAL PHASED ARRAY FOR WIDE-ANGLE BEAMSTEERING", MEMS 2017, Las Vegas, NV, USA, Jan. 22-26, 2017, which is incorporated herein by reference. MEMS mirrors provide reasonably wide-angle operation and a useful, if still undersize, aperture area but they are mechanical and not fast enough for many applications and are plagued by delicacy issues, because a jarring bump can dislodge the mirror.

A pair of wedge prisms, called a Risley prism pair, has also been used for beam steering. Rotating one wedge of the wedge pair in relation to the other changes the direction of an incoming beam. When the wedges angle in the same direction, the angle of the refracted beam becomes greater. When the wedges are rotated to angle in opposite directions, they cancel each other out, and the beam is allowed to pass straight through.

Electro-optic phase shifters have been used to alter the phase of an incident optical ray in response to an applied voltage. However the effect is quite small and not sufficient for some applications. These prior art electro optic phase shifters use electro optical (E/O) phase shifting materials such as lithium niobate.

There are many other schemes in the prior art for beam steering for automotive LIDAR. Most use mechanical beam steering.

What is needed is an improved optical beam steering device that has no moving parts, and is rugged and less complex than those in the prior art. Also needed is a wide angle field of regard and a low optical loss. The embodiments of the present disclosure answer these and other needs.

SUMMARY

In a first embodiment disclosed herein, a solid state optical beam steering device comprises a body of electro-optical material wherein the body of electro-optical material comprises any material of a class of hydrogen-doped phase-change metal oxide and wherein the body has a first face and a second face opposite the first face, a first transparent resistive sheet on the first face of the body of electro optic material, wherein the first transparent resistive sheet has a first side and a second side, and a transparent conductor on the second face of the body of electro optic material, wherein the transparent conductor is coupled to the second side of the first transparent resistive sheet.

In another embodiment disclosed herein, a solid state optical beam steering device comprises a body of electro-optical material wherein the body of electro-optical material comprises any material of a class of hydrogen-doped phase-change metal oxide and wherein the body has a first face and a second face opposite the first face, a first transparent resistive sheet on a first face of the body of electro-optical material, wherein the first transparent resistive sheet extends along the first face, a second transparent resistive sheet on a second face of the body of electro-optical material, wherein the second transparent resistive sheet extends along the second face, a first voltage coupled between a first end and a second end of the first transparent resistive sheet, and a second voltage coupled between a first end and a second end of the second transparent resistive sheet, wherein the first end and the second end of the first transparent resistive sheet are opposite each other, wherein the first end and the second end of the second transparent resistive sheet are opposite each other, wherein the first voltage biases the first transparent resistive sheet in a first direction, and wherein the second voltage biases the second transparent resistive sheet in a second direction.

In yet another embodiment disclosed herein, a solid state optical beam steering device comprises an array of a plurality of optical beam steering elements, wherein each optical beam steering element comprises a body of electro-optical material wherein the body of electro-optical material comprises any material of a class of hydrogen-doped phase-change metal oxide and wherein the body has a first face and a second face opposite the first face, a first transparent resistive sheet on a first face of the body of electro-optical material, wherein the first transparent resistive sheet extends along the first face, and a second transparent resistive sheet on a second face of the body of electro-optical material, wherein the second transparent resistive sheet extends along the second face.

In still another embodiment disclosed herein, a method of providing optical beam steering comprises providing a body of electro-optical material wherein the body of electro-optical material comprises any material of a class of hydrogen-doped phase-change metal oxide and wherein the body has a first face and a second face opposite the first face, providing a first transparent resistive sheet on the first face of the body of electro optic material, wherein the first transparent resistive sheet has a first side and a second side, providing a transparent conductor on the second face of the body of electro optic material, wherein the transparent conductor is coupled to the second side of the first transparent resistive sheet, and applying a voltage between the first side of the first transparent resistive sheet and the transparent conductor to apply a voltage bias across the first transparent resistive sheet.

In still yet another embodiment disclosed herein, a method of providing two dimensional optical beam steering comprises providing a body of electro-optical material wherein the body of electro-optical material comprises any material of a class of hydrogen-doped phase-change metal oxide and wherein the body has a first face and a second face opposite the first face, providing a first transparent resistive sheet on a first face of the body of electro-optical material, wherein the first transparent resistive sheet extends along the first face, providing a second transparent resistive sheet on a second face of the body of electro-optical material, wherein the second transparent resistive sheet extends along the second face, applying a first voltage between a first end and a second end of the first transparent resistive sheet, and applying a second voltage between a first end and a second end of the second transparent resistive sheet, wherein the first end and the second end of the first transparent resistive sheet are opposite each other; wherein the first end and the second end of the second transparent resistive sheet are opposite each other, wherein the first voltage biases the first transparent resistive sheet in a first direction, wherein the second voltage biases the second transparent resistive sheet in a second direction, and wherein the second direction is orthogonal to the first direction.

In yet another embodiment disclosed herein, a method of providing optical beam steering comprises providing an array of a plurality of optical beam steering elements, wherein providing each optical beam steering element comprises providing a body of electro-optical material wherein the body of electro-optical material comprises any material of a class of hydrogen-doped phase-change metal oxide and wherein the body has a first face and a second face opposite the first face, providing a first transparent resistive sheet on a first face of the body of electro-optical material, wherein the first transparent resistive sheet extends along the first face, providing a second transparent resistive sheet on a second face of the body of electro-optical material, wherein the second transparent resistive sheet extends along the second face, applying a first voltage between a first end and a second end of the first transparent resistive sheet, and applying a second voltage between a first end and a second end of the second transparent resistive sheet, wherein the first end and the second end of the first transparent resistive sheet are opposite each other, wherein the first end and the second end of the second transparent resistive sheet are opposite each other, wherein the first voltage biases the first transparent resistive sheet in a first direction, wherein the second voltage biases the second transparent resistive sheet in a second direction, and wherein the second direction is orthogonal to the first direction These and other features and advantages will become further apparent from the detailed description and accompanying figures that follow. In the figures and description, numerals indicate the various features, like numerals referring to like features throughout both the drawings and the description.

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Figure 1:
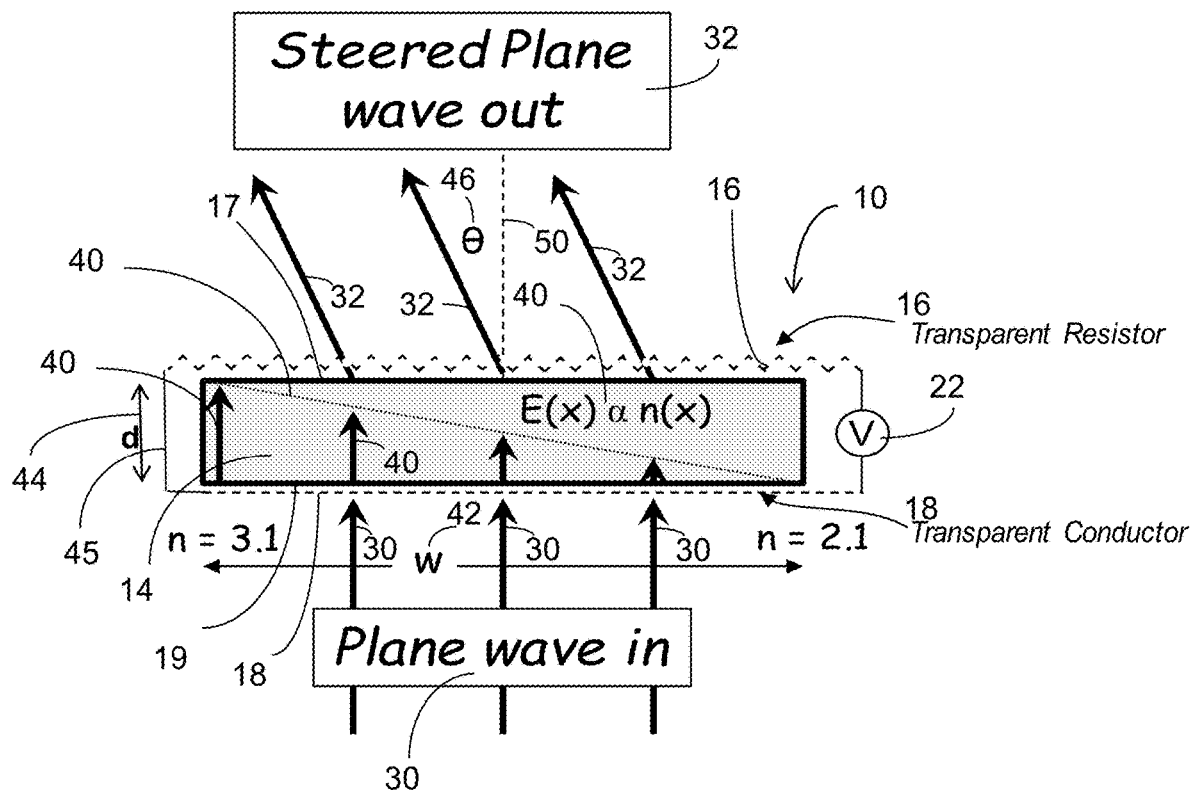
FIG. 1 shows an embodiment for steering an optical plane wave using a solid state electrically-variable optical wedge in accordance with the present disclosure.

The present disclosure describes a solid state electrically-variable optical wedge (SSEVOW) 10, shown in FIG. 1, composed of an electro-optical (E/O) material 14. The electro-optical material 14 may include any of a class of hydrogen-doped phase-change metal oxide (H-PCMO) materials typified by neodymium nickelate ($NdNiO_3$). This material is the subject of U.S. Provisional Patent Application Ser. No. 63/027,847, filed May 20, 2020, entitled "Method to Grow IR Optical Materials with Extremely Small Optical Loss", and U.S. Provisional Patent Application Ser. No. 63/027,849, filed May 20, 2020, entitled "Method to Grow Thick Crystalline Optical Films on Si Substrates", which are incorporated herein by reference. The electro-optical material 14 may, in addition to $NdNiO_3$, be $SmNiO_3$, PrNiO3, $EuNiO_3$, and $GdNiO_3$. These materials may be used individually or combined to form the E/O material 14 utilized in the embodiments described herein. The E/O H-PCMO material 14 is essentially transparent over the infrared wavelength range, and may have an extremely small optical loss, for example, an optical extinction coefficient k less than 0.001.

Figure 6:
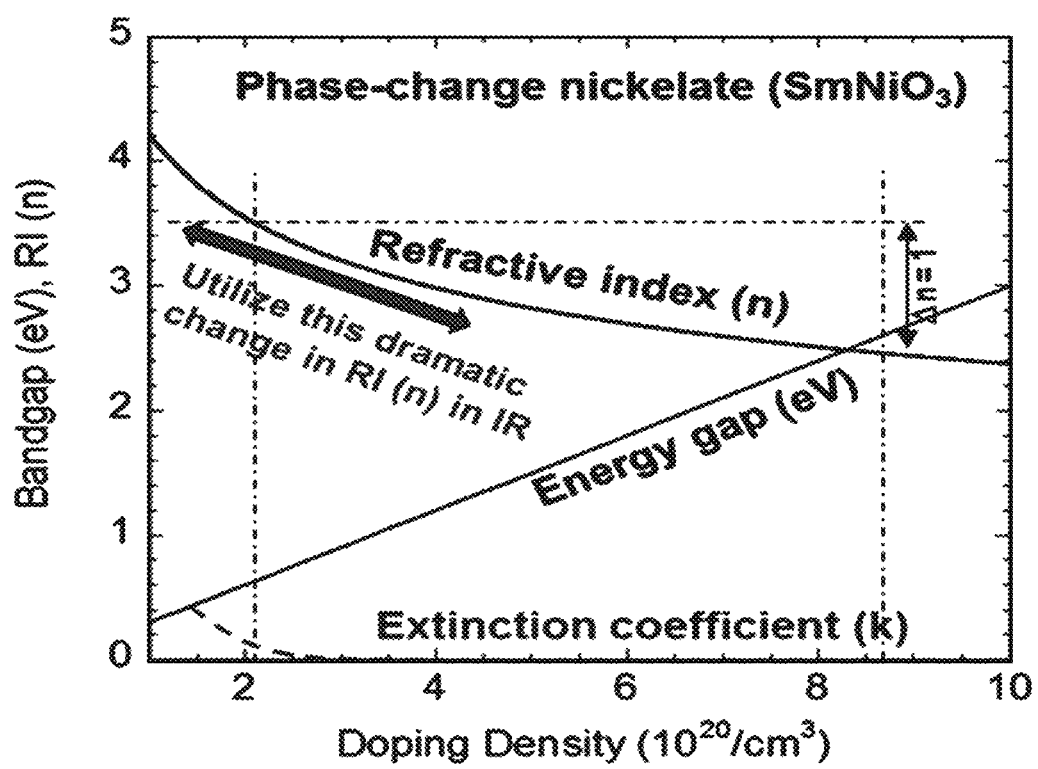
FIG. 6 shows an example change in bandgap (eV) and refractive index of material as a function of hydrogen doping density in accordance with the present disclosure.

The E/O material 14 changes its index of refraction when an electric field is applied to the E/O material 14. FIG. 6 shows the change in bandgap (eV) and refractive index as a function of hydrogen doping density for $SmNiO_3$. The refractive index (RI) is a complex number usually written RI=n+i*k. The left axis of FIG. 6 shows the bandgap in eV, RI(n) the real part of the refractive index, and RI(k) the imaginary part of the refractive index. The real part n indicates the phase velocity, while the imaginary part κ is called the extinction coefficient. For the material $SmNiO_3$, FIG. 6 shows that it is desirable to have a hydrogen doping density of up to about 10^21 hydrogen ions/cm^3 to achieve a desired refractive index change.

With continued reference to FIG. 1, the electro-optical (E/O) material 14 may have a width 42 and a depth 44 between a first face 19 and a second face 17 of the E/O material 14. The E/O material 14 changes its index of refraction when an electric field is applied to the E/O material 14. A transparent electrode or conductor 18 is on the first face 19 of the E/O material 14 and a transparent resistive sheet 16 is on the second face 17 of the E/O material 14. The transparent resistive sheet 16 is connected to the transparent electrode 18 by the return connection 45 to complete the circuit for the resistive sheet.

A constant direct current voltage 22 applied between the transparent electrode or conductor 18 and the transparent resistive sheet 16 results in a graduated electric field 40 that varies linearly across the width w 42 of the E/O material. In FIG. 1 an input optical plane wave 30, which is in a direction of a nominal optical axis 50, is applied to the first face 19 of the E/O material 14. The example input optical plane wave 30 in FIG. 1 is shown in a direction perpendicular to the width w 42 of the E/O material 14.

The graduated electric field 40 has a linear gradient in the induced index of refraction that varies across the width w 42 of the E/O material. The transverse gradient of the index of refraction deflects the light ray of the input optical plane wave 30 by an angle governed by Snell's law (n sin θ=constant), as shown by steered optical plane wave out 32, which is steered by an angle θ 46 from the nominal optical axis 50. By changing the voltage V 22 the index of refraction may be varied to vary the angle θ 46 of the steered optical plane wave out 32, thus providing electrically selective beam steering.

Figure 2:
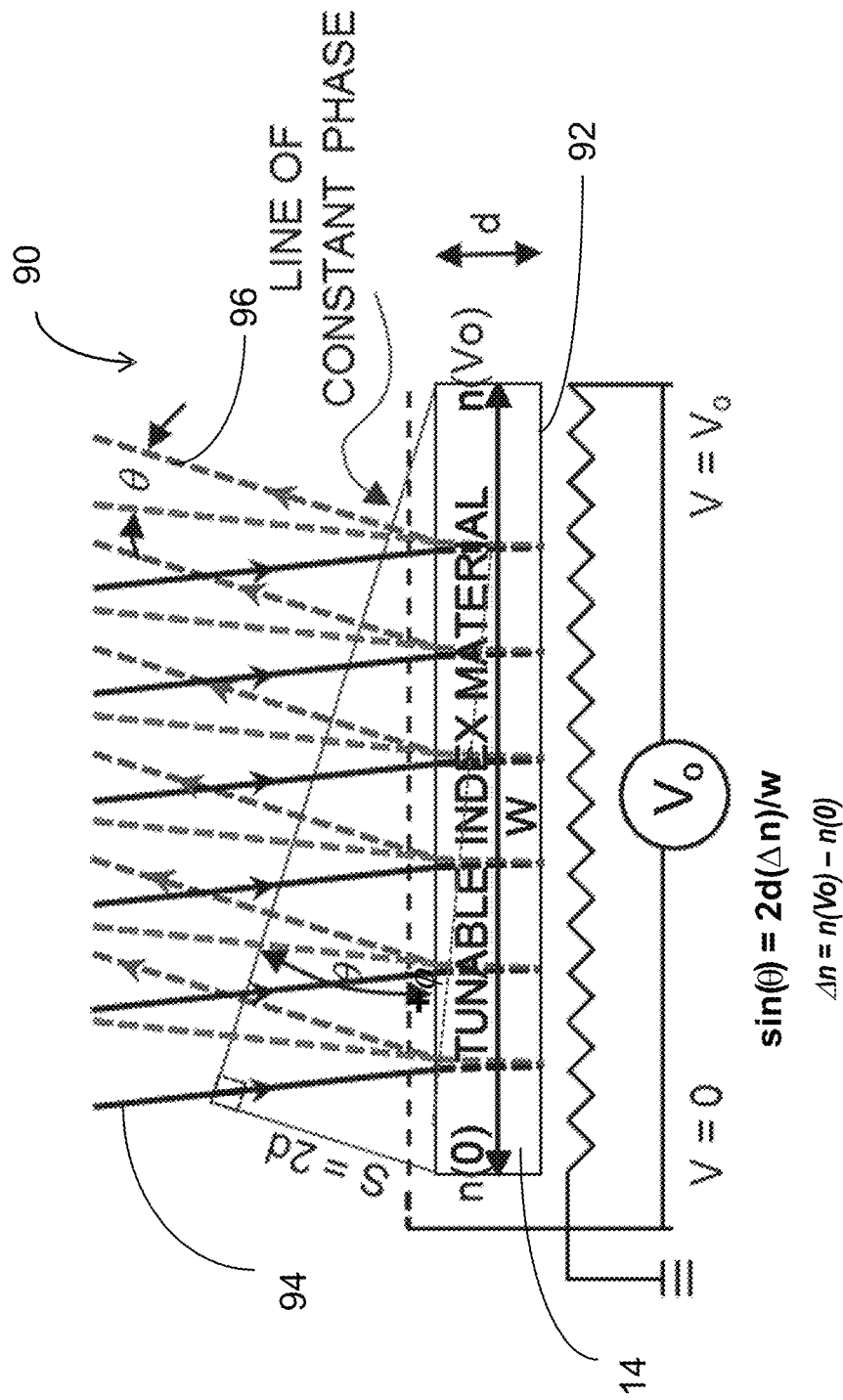
FIG. 2 is a side elevation view of a reflective embodiment for steering an optical plane wave using a solid state electrically-variable optical wedge in accordance with the present disclosure.

FIG. 1 shows the solid state electrically-variable optical wedge (SSEVOW) steering an optical beam being transmitted through the SSEVOW in a transmission mode. Instead the solid state electrically-variable optical wedge (SSEVOW) may be configured and used in a reflective embodiment, as shown in FIG. 2, which shows a solid state electrically-variable optical wedge (SSEVOW) 90 with the E/O material 14. The solid state electrically-variable optical wedge (SSEVOW) 90 in FIG. 2 has a mirror 92 which reflects the incident light wave 94 back into the E/O material 14. Because the light wave travels two times through the E/O material 14, the same steering effect as the transmissive configuration of, for example FIG. 1, may be obtained with one-half the thickness of E/O material 14. The voltage necessary to achieve a particular electric field level inside the E/O material 14 may be reduced at the expense of a limited field of regard due to self-shadowing and a higher element capacitance which results in a slower temporal response.

Figure 3:
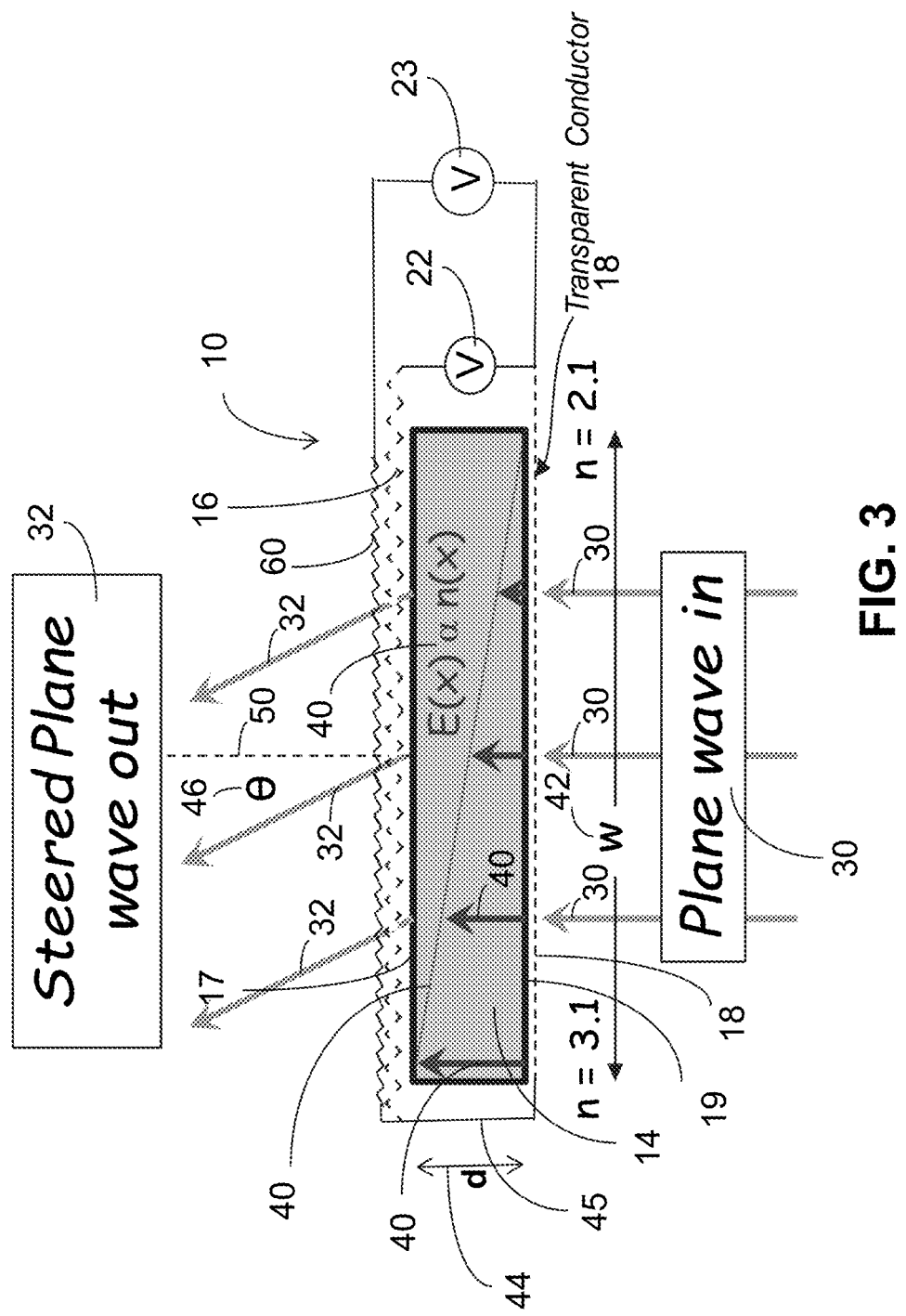
FIG. 3 shows another embodiment for steering an optical plane wave using a solid state electrically-variable optical wedge in accordance with the present disclosure.

The configuration of FIG. 1 can perform one dimensional (1-D) beam steering. FIG. 3 shows a configuration for two dimensional (2-D) beam steering. Two dimensional beam steering is provided for by adding a second transparent resistive sheet 60 on the second face 17 of the material 14 adjacent to and either above or below the transparent resistive sheet 16 that has a voltage 23 biased in an different direction to the first transparent resistive sheet 16. The voltage 23 is connected between the second transparent resistive sheet 60 and the transparent electrode or conductor 18. Another end or side of the second transparent resistive sheet 60 is connected to another end or side of the transparent electrode 18 by connector 45 to complete the circuit for the second transparent resistive sheet 60. The direction of the voltage 23 across the second transparent resistive sheet 60 may be orthogonal to the direction of the voltage 22 across the first transparent resistive sheet 16. Such an orthogonal arrangement of the voltage 22 across the first transparent resistive sheet 16 and the voltage 23 across the second transparent resistive sheet 60 results in a solid state electrically-variable optical wedge (SSEVOW) that behaves like a gimbaled optical beam steerer or gimbaled mirror, except there are no moving parts, and there is no inertia to slow response time.

Figure 4:
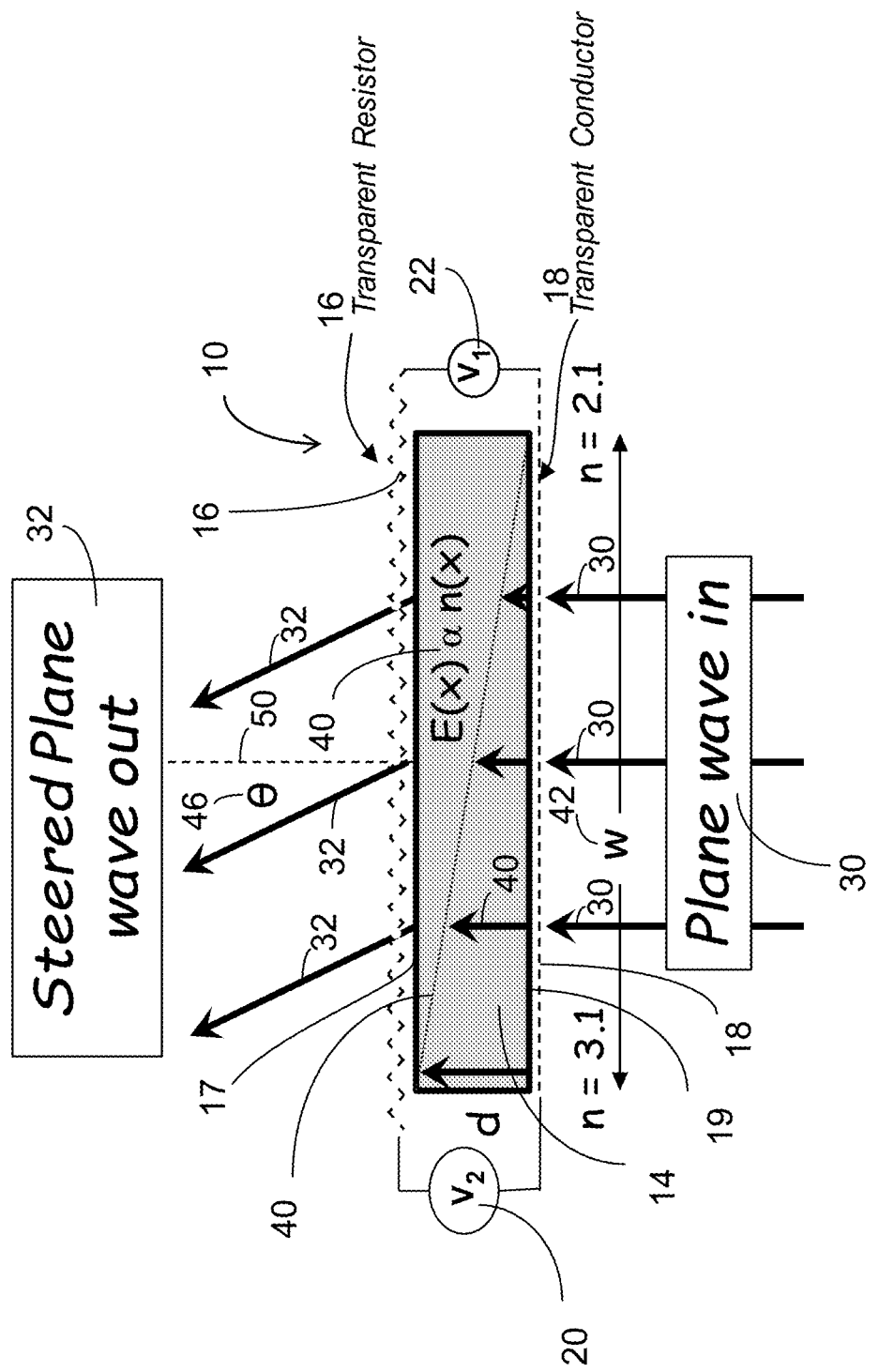
FIG. 4 shows yet another embodiment for steering an optical plane wave using a solid state electrically-variable optical wedge in accordance with the present disclosure.

For certain applications, it is also desirable to apply a dynamically variable phase-delay. FIG. 4 shows an embodiment for beam steering and applying a phase-delay. The values of $V_1$ 22 and $V_2$ 20 determine the steered out angle and the phase-delay of the steered optical plane wave out 32, respectively.

The configuration of FIG. 4 behaves like an electro-optic phase shifter with a very wide acceptance angle. The difference between $V_1$ 22 and $V_2$ 20 in FIG. 4 sets the electrical gradient across the width w 42 of the E/O material 14 and hence the index of refraction gradient. The value of $V_2$ 20 establishes an overall offset electric field and hence an offset index of refraction value that results in a controllable phase shift in the output light.

The solid state electrically-variable optical wedge (SSEVOW) 10 can perform the same functions as a prior art optical phased array (OPA). While the SSEVOW may only require two control lines, a prior art OPA with the same area as the SSEVOW may require N=1975 control lines, where N is given by $N=4*area/\lambda^2$. Thus, the SSEVOW of the present disclosure is significantly less complex compared to the prior art.

Figure 5:
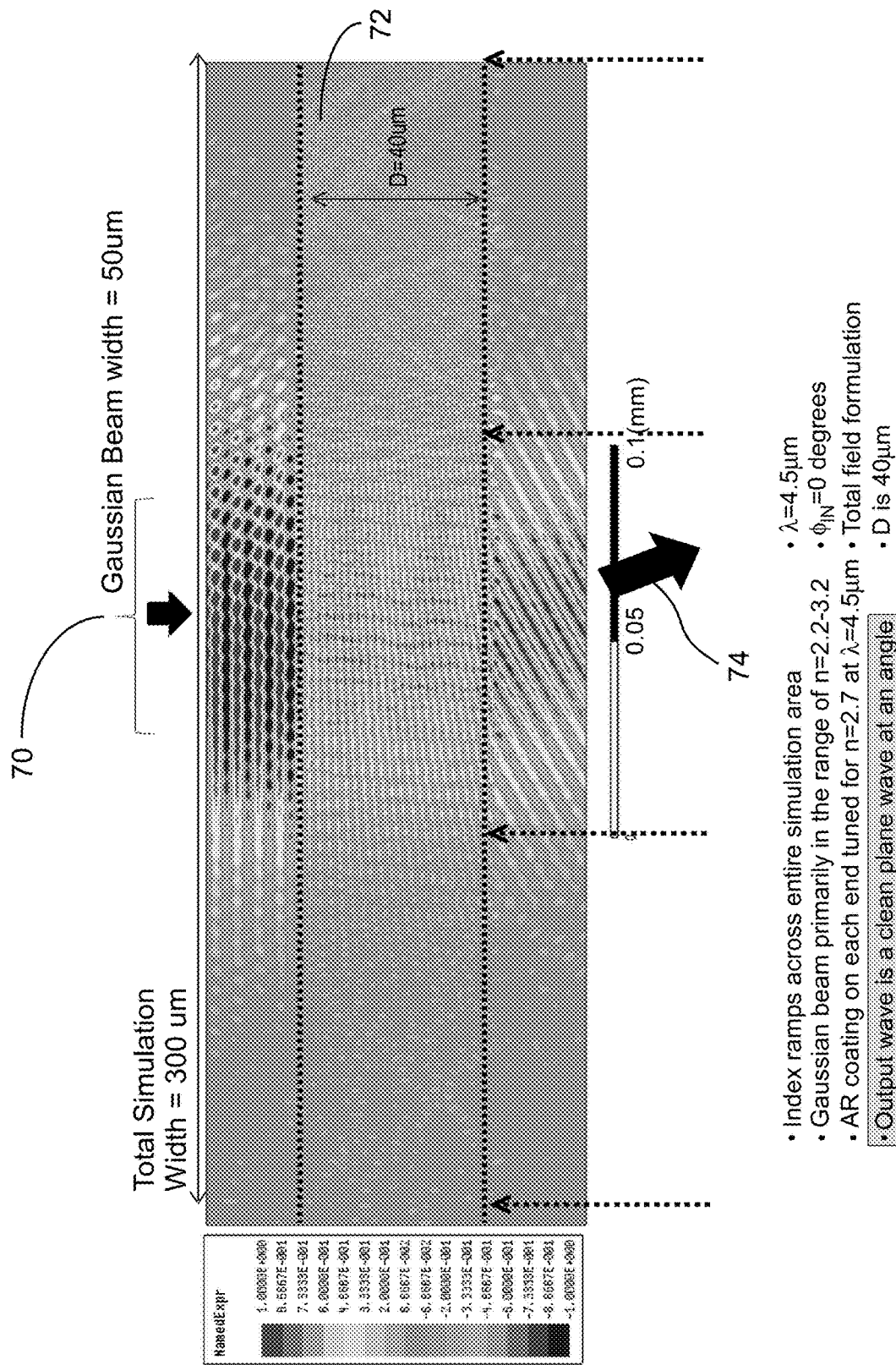
FIG. 5 shows an example result of simulation of the operation of the solid state electrically-variable optical wedge on an optical wave in accordance with the present disclosure.

The operation of the solid state electrically-variable optical wedge on an optical wave has been simulated by using the HFSS full-wave modeling tool. FIG. 5 shows a sample result and depicts a Gaussian-shaped plane wave 70 incident from above on simulated SSEVOW material 72 of thickness 40 microns and width of 100 microns (between n=2.2 and n=3.2). The output wave 74 is a clean plane wave at the expected angle for the imposed index gradient. It is noted that for the simulation the lateral extent of the simulated material was extended beyond the stated 100 microns in order to avoid edge-related artifacts in the simulation code.

As discussed above, FIG. 6 shows the change in bandgap (eV) and refractive index as a function of hydrogen doping density for the particular material $SmNiO_3$.

Figure 7:
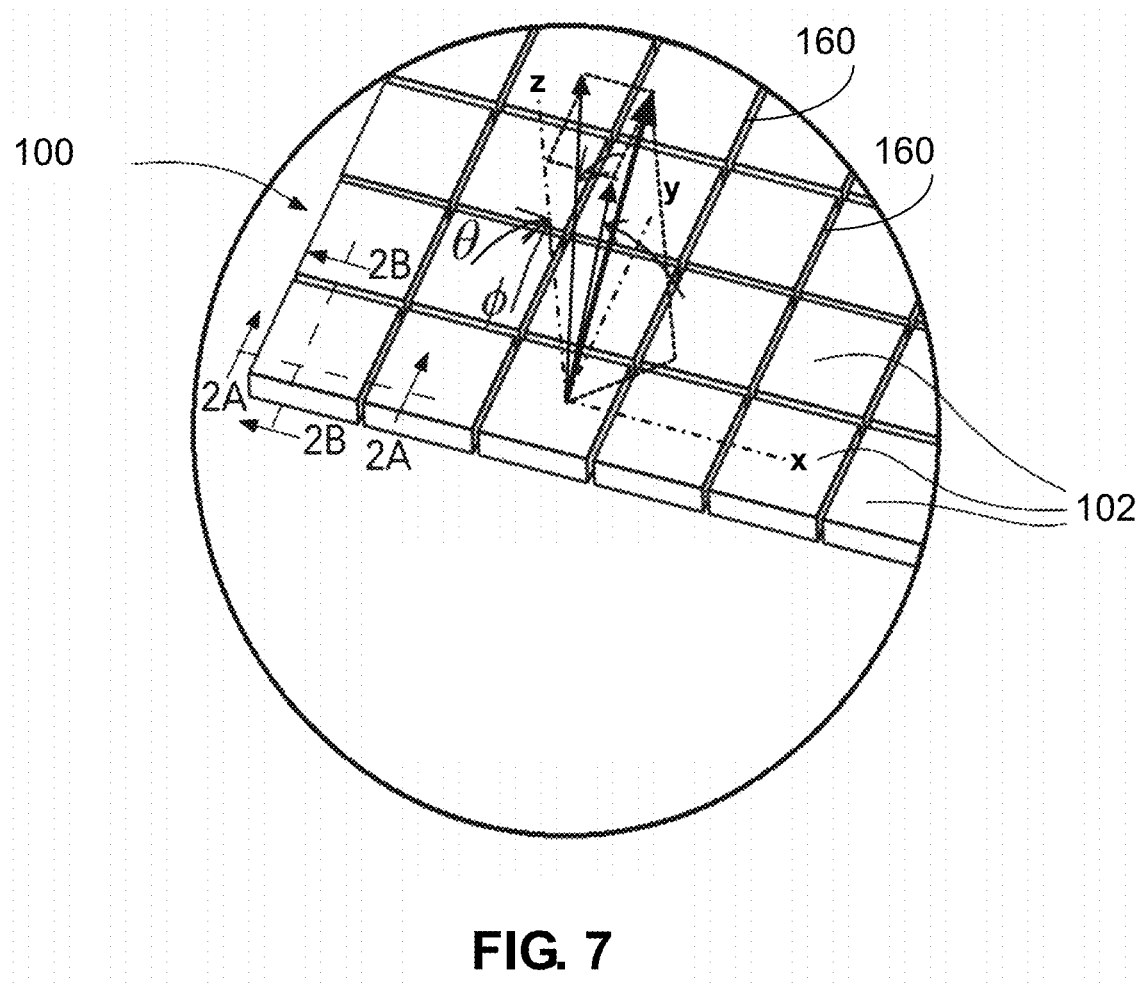
FIG. 7 depicts a two dimensional array of elements, in which each element may direct its beamlet in a same direction $(\theta,\varphi)$ and provide up to a $2\pi$ phase lag to cohere all beamlets from the array of elements into a single beam in accordance with the present disclosure.
Figure 8:
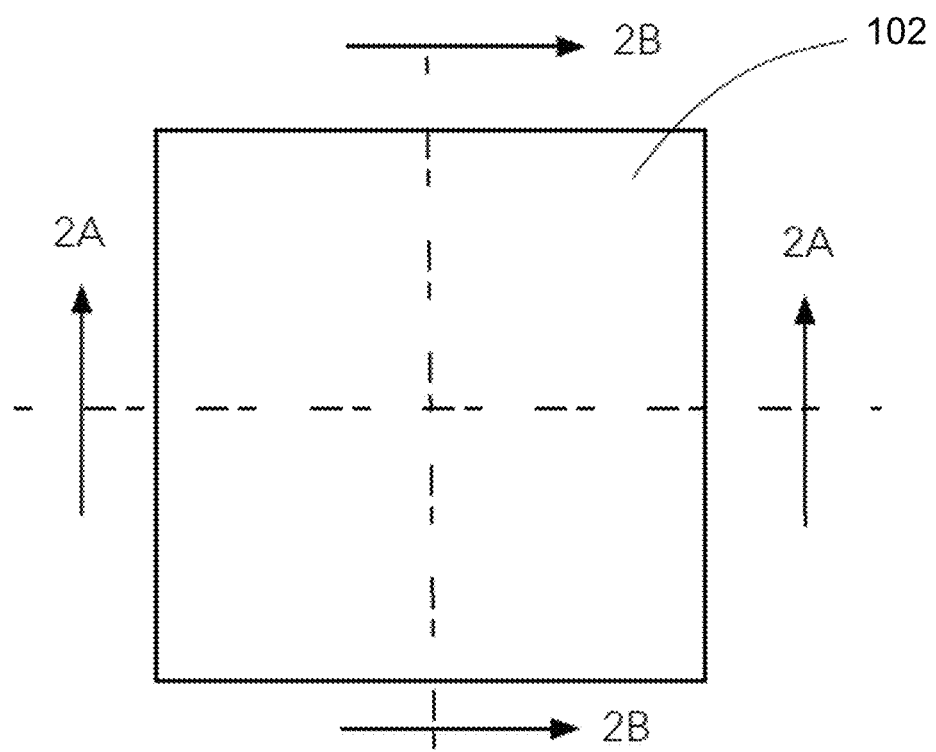
FIG. 8 shows a plan view of a single element of the two dimensional array of elements shown in FIG. 7 and showing the orientations 2A and 2B of the element in accordance with the present disclosure.

FIG. 7 depicts a two dimensional array 100 of elements 102, which together form a solid-state tip-tilt-phased array. FIG. 8 is a plan view of a single element 102 and together with FIG. 7 shows the orientations 2A and 2B of the element. These elements 102 are also illustrated in FIGS. 1-4 and 9-13. The two dimensional array 100 may have N×N elements 102; however, a solid-state tip-tilt-phased array may also be formed with a single element 102. Each element includes the electro-optical (E/O) material 14 which as described above may be of a class of hydrogen-doped phase-change metal oxide (H-PCMO) materials typified by neodymium nickelate ($NdNiO_3$). As further described above, H-PCMO materials in addition to $NdNiO_3$ may be used, including $SmNiO_3$, $PrNiO_3$, $EuNiO_3$, and $GdNiO_3$. These materials may be used individually or combined to form the E/O material 14 utilized in the embodiments described herein. The E/O H-PCMO material 14 is essentially transparent over the infrared wavelength range, and may have an extremely small optical loss, for example, an optical extinction coefficient k less than 0.001.

Figure 9:
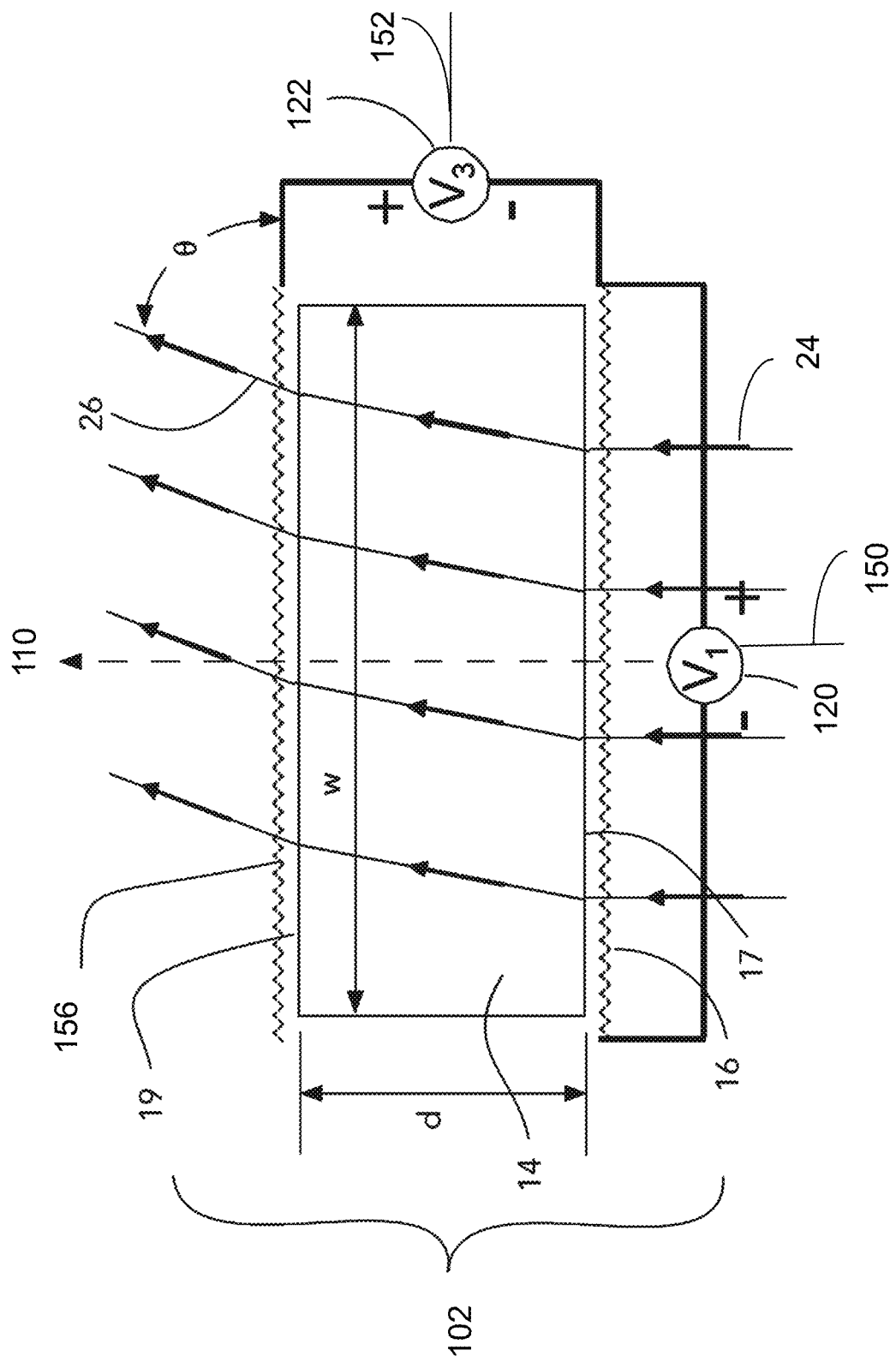
FIGS. 9, 10 and 11 show the elements of the array in greater detail and show the voltages applied to each element in accordance with the present disclosure.
Figure 10:
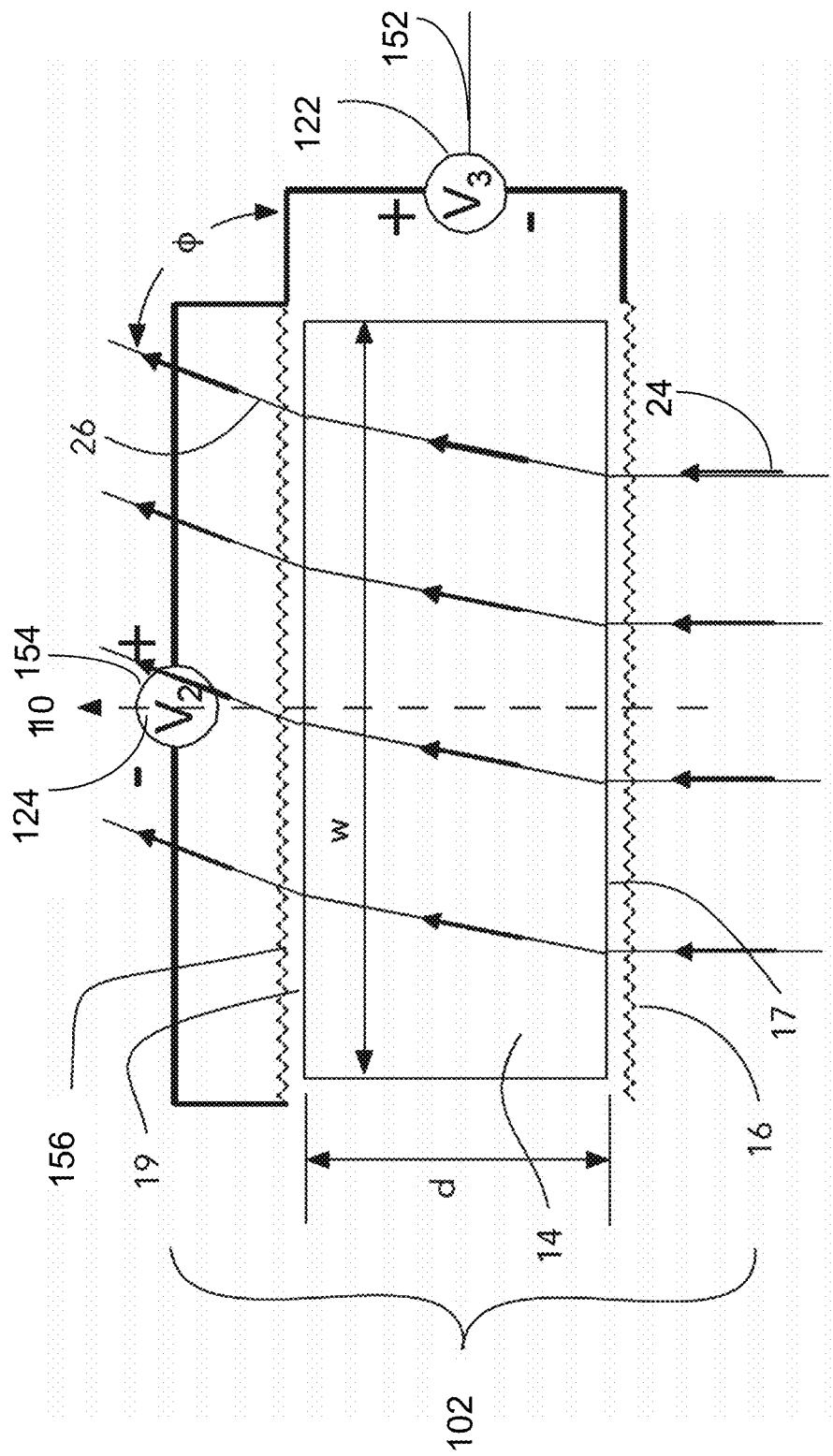
Figure 11:
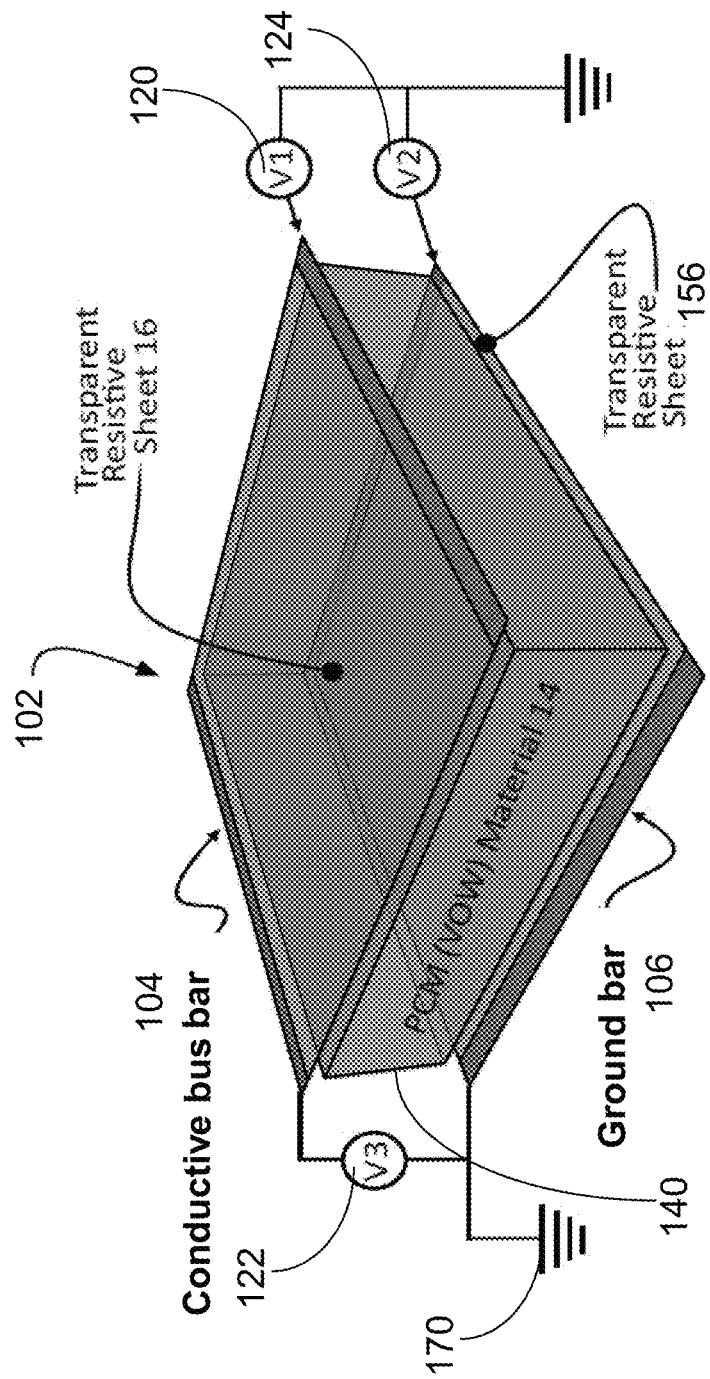

FIG. 11 is a three dimensional view showing how control voltages $V_1$ 120, $V_2$ 124, and $V_3$ 122 are applied. Control voltages $V_1$ 120 and $V_2$ 124 are applied across transparent resistive sheets 16 and 156, which are arranged across opposite sides of the E/O material 14. The voltage fields created by $V_1$ 120 and $V_2$ 124 are set at a right angle to each other, as best shown in FIG. 11. FIGS. 9 and 10 are side elevational views taken at a right angle to each other. With reference to FIG. 7, FIG. 9 is a cross sectional view of element 102 along the cut 2A-2A and FIG. 10 is a cross sectional view of element 102 along the cut 2B-2B. In FIGS. 9 and 11 control voltage $V_1$ 120 is applied across transparent resistive sheet 16, while in FIGS. 10 and 11 control voltage $V_2$ 124 is applied across transparent resistive sheet 156 in a direction at a right angle to the control voltage $V_1$ 120 applied across transparent resistive sheet 16. Control voltage $V_3$ 122 is further discussed below. FIGS. 9 and 10 show the control lines 150, 152 and 154 that control voltages V1 120, $V_3$ 122, and $V_2$ 124, respectively.

FIG. 11 is a three dimensional view showing the voltages applied to the resistive sheets 16 and 156. The resistive sheets 16 and 156 may be made of any suitable material, such as vanadium oxide, tin oxide, a nanowire grid, graphite sheets, or other materials known in the art. The value of the sheet resistance in Ohms/square of sheets 16 and 156 may be selected for good device design noting that the overall resistance sets the current necessary to maintain a set voltage and, hence, establishes overall power consumption by the element 102.

One side of each sheet 16 and 156 may have a conductive bus bar disposed at one edge thereof while the voltage to be applied is applied to a conductive bus bar disposed at the opposing edge thereof. The conductive bus bar 106 may be a conductive bus bar 106 directly coupled to ground 170, while the conductive bus bar 104 of sheet 16 may be coupled to ground via control voltage $V_3$ 122. If control voltage $V_3$ 122 is zero volts, then the conductive bus bar 104 is directly coupled to ground. The corner where the control voltage $V_3$ 122 is applied may be thought of as a common ground corner 140, especially when control voltage $V_3$ 122 has a voltage of zero volts or control voltage $V_3$ 122 is not utilized, in which case the control voltage $V_3$ 122 shown in the figures would be replaced with a wire connection.

Figure 12:
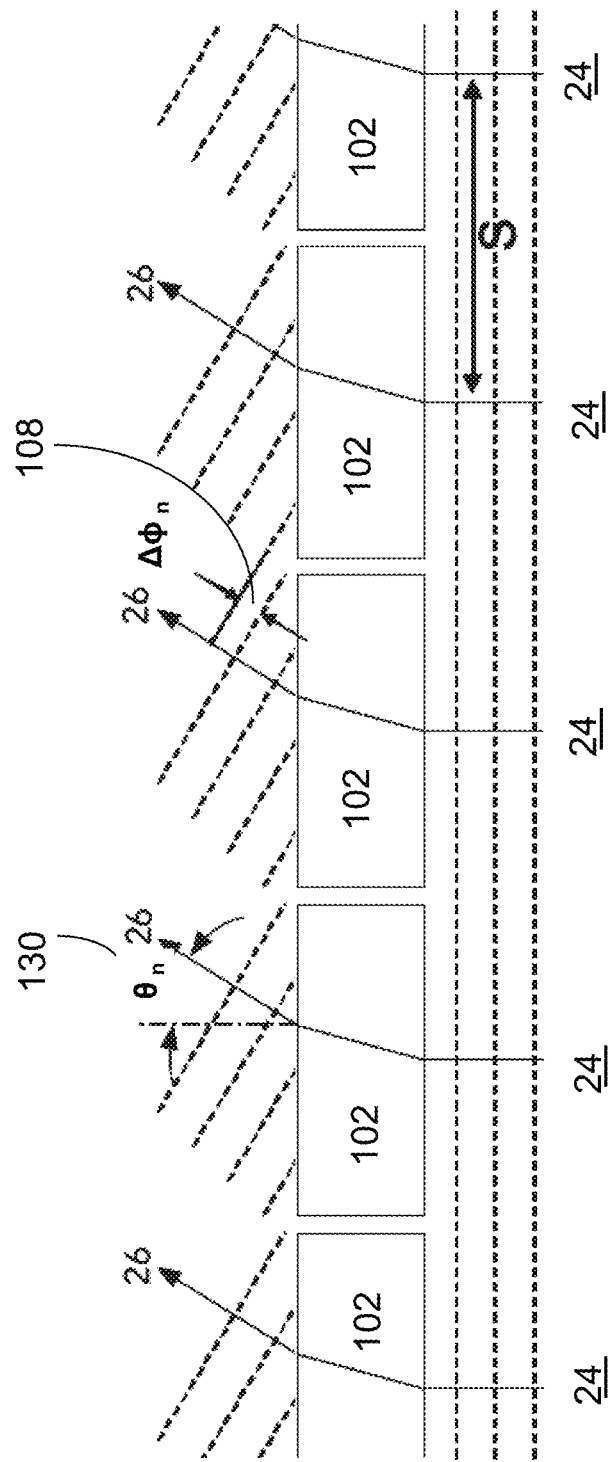
FIG. 12 is a side elevational view a portion of the array of elements with a plane-wave incident from below becoming many beamlets that are made to cohere into one beam in accordance with the present disclosure.

Consider the top resistive sheet 16. Applying $V_1$ 120 to its bus bar results in a linear voltage gradient between $V_1$ 120 and the conductive bus bar 104. Likewise, $V_2$ 124 results in a similar smooth gradient in the cross-direction in bottom resistive sheet 156 between $V_2$ 124 and the ground bus bar 106. Together these two voltages steer the beam of incident light 24 to outgoing light 26, as shown in FIGS. 9, 10 and 12. The voltage $V_3$ 122 is needed at the pinned corner between resistive sheets 16 and 156 only if there is a desire to apply an over-all phase adjustment to the light passing through the E/O material 14. If there is only a single-element 102 for solid-state tip-tilt-phased array 50, then the voltage $V_3$ 122 is replaced with a short circuit that grounds sheets 16 and 156 at the common ground corner 140 of the element 102. All voltages are referenced to wafer-ground, so only a single control line is required for each. The gradient across the bottom resistive sheet 156 is $V_2/w$, where w is the width of the element 102. The gradient across the top resistive sheet 16 is then $(V_1-V_3)/w$, again where w is the width of the element 102.

Each element 102 directs an outgoing beamlet 26 in the same direction $(\theta, \varphi)$ and provides up to a $2\pi$ phase lag to cohere all beamlets 26 into a single beam. Relative to the x, y, and z axes in FIG. 7, with the array 100 in the x-y plane, then $\theta$ is the angle between the z-axis and the projection of beamlet 26 onto the x-z plane, and $\varphi$ is the angle between the z-axis and the projection of beamlet 26 onto the x-y plane.

Each E/O material 14 has transparent resistive sheet 16 disposed at or on a first face 17 of the body 102 and a transparent electrode 18 disposed at or on a second face 19 of the body 102. Each element 102 has a control line to each voltage $V_1$ 120, $V_2$ 124, and $V_3$ 122, to apply a $\theta$ angle modifying voltage $V_1$ 120 to transparent resistive sheet 16, a $\varphi$ angle modifying voltage $V_2$ 124 to transparent resistive sheet 156, and a phase-voltage $V_3$ 122 between sheets 16 and 156.

The first two voltages $V_1$ 120 and $V_2$ 124 are preferably common for all elements 102 in the array 100. The phase-voltage $V_3$ 122 is preferably unique to each element 102 depending upon the desired output angles. If all of the voltages $V_1$ 120 and $V_2$ 124 in the array are the same, then one beam is produced. This single beam embodiment may well be the most useful embodiment. On the other hand, if instead half of the voltages $V_1$ 120 and $V_2$ 124 in the array 100 are different than the other half, then two beams may be produced. In this embodiment each beam has a higher divergence than the single beam embodiment. It should be apparent that this may be generalizable to a many beam embodiment and dissimilar beam embodiments, when such embodiments are desired.

Each element 102 may be wired with three control lines 150, 154, and 152 for the three voltages, $V_1$ 120, $V_2$ 124, and $V_3$ 122, respectively, as shown in FIGS. 9, 10 and 11. The orientation of the voltage gradients generated by $V_1$ 120 and $V_2$ 124 are preferably at right angles to each other or orthogonal to each other and orthogonal to the nominal optical axis 110 of the element 102, as shown in FIGS. 10 and 11 of the element 102. The third voltage, $V_3$, 122 is used to adjust the overall phase of the beamlet such that its phase is spatially aligned with its neighbors. This phase-matching process is called "beamforming" in that it combines the array of N×N beamlets 26 from array 100 into a single beam that behaves as if it were emitted from the whole aperture 100. The phase-match is obtained by adjusting voltage $V_3$ 122 until the gap marked $\Delta\phi_n$ 108 in FIG. 12 becomes zero. The gap $\Delta\phi_n$ 108 corresponds to the element-to-element phase mismatch. It changes depending on output angle. In order to 'cohere' a beam, that element-to-element phase mismatch is driven to zero by adjusting the voltage $V_3$ 122.

FIG. 7 shows the elements 102 spaced apart by small gaps 160. Those gaps 160 may be used to run the control wires 150, 154 and 152 for the voltages $V_1$ 120, $V_2$ 124 and $V_3$ 122, respectively, applied to each element 102.

FIG. 12 shows a portion of the two dimensional array 100 of elements 102, shown in FIG. 7, in a side-view with a plane-wave 24 incident from below becoming many beamlets 26 deflected by angle $\theta_n$ (where n refers to the nth ring from the center) 130 and further indicating the phase adjustment $\Delta\phi_n$ 108 that must be made to cohere the beamlets 26 into a single point at a distance f in order to perform as a lens with focal length f. The phase lag between elements is given by Phase Lag=$\Delta\phi_n$=$(8*\pi*s^2/\lambda)*(n-1/2)/\text{sqrt}(f^2+4n^2s^2)$, but it is only necessary to apply the phase difference within the nearest $2\pi$: Applied Phase Lag=modulo (Phase Lag, $2\pi$). This set of relative phase lags results in a piece-wise approximation to a spherical wavefront converging on a point at distance f, i.e the action of a lens. Each angle $\theta_n$ and phase adjustment $\Delta\phi_n$ is unique to each ring of the structure, set by the desired focal length of the lens assembly.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of. . . ."

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. A solid state optical beam steering device comprising:
   a solid state body of electro-optical material wherein the solid state body of electro-optical material comprises a material of a class of hydrogen-doped phase-change metal oxide and wherein the solid state body has a first face and a second face opposite the first face;
   a conductor on the first face of the solid state body of the electro optic material;
   a first resistive sheet on the second face of the solid state body of the electro optic material, wherein the first resistive sheet has a first side and a second side; and
   wherein the conductor is electrically connected to the second side of the first resistive sheet; and
   wherein the electro-optical material comprises $NdNiO_3$, $SmNiO_3$, $PrNiO_3$, $EuNiO_3$, or $GdNiO_3$ or any combination of $NdNiO_3$, $SmNiO_3$, $PrNiO_3$, $EuNiO_3$, $GdNiO_3$, wherein a refractive index of the electro-optical material is configured to be controlled by a hydrogen doping density.

2. The solid state optical beam steering device of claim 1 further comprising:
a first voltage source applied between the first side of the first resistive sheet and the conductor to apply a voltage bias across the first resistive sheet;
wherein the first voltage source is variable to select a beam steering angle.

3. The solid state optical beam steering device of claim 1:
wherein when a voltage gradient is applied along the second face of the electro optic material, a gradient in the index of refraction steers light entering the first face at a first angle to exit from the second face at a second angle, the solid state optical beam steering device operating in a transmission mode; or
wherein the solid state optical beam steering device further comprises a mirror on the first face of the solid state body of electro optic material;
wherein when a voltage gradient is applied along the second face of the electro optic material, a gradient in the index of refraction steers light entering the second face at a first angle to be reflected by the mirror and to exit from the second face at second angle, the solid state optical beam steering device operating in a reflection mode.

4. The solid state optical beam steering device of claim 1 where the first resistive sheet and the conductor are each transparent.

5. The solid state optical beam steering device of claim 4 further comprising:
a second transparent resistive sheet on the second face of the electro optic material adjacent to and either above or below the first transparent resistive sheet, the second transparent resistive sheet having a third and a fourth side, wherein the fourth side is electrically connected to the transparent conductor.

6. The solid state optical beam steering device of claim 5 further comprising:
a second voltage source applied between the third side of the second transparent resistive sheet and the transparent conductor to apply a voltage bias across the second transparent resistive sheet.

7. The solid state optical beam steering device of claim 6:
wherein the first voltage source biases the first transparent resistive sheet in a first direction;
wherein the second voltage source biases the second transparent resistive sheet in a second direction; and
wherein the second direction is orthogonal to the first direction.

8. The solid state optical beam steering device of claim 7 further comprising:
a second variable voltage applied between the first transparent resistive sheet and the transparent conductor;
wherein the second variable voltage is variable to apply a variable phase-delay.

9. A solid state optical beam steering device comprising:
a solid state body of electro-optical material wherein the solid state body of electro-optical material comprises any material of a class of hydrogen-doped phase-change metal oxide and wherein the solid state body has a first face and a second face opposite the first face;
a first resistive sheet on a first face of the solid state body of electro-optical material, wherein the first-resistive sheet extends adjacent the first face; and
a second sheet on a second face of the solid state body of electro-optical material, wherein the second sheet extends along the second face;
wherein an end of the first resistive sheet and an end of the second sheet are electrically connected to one another; and
wherein the electro-optical material comprises $NdNiO_3$, $SmNiO_3$, $PrNiO_3$, $EuNiO_3$, or $GdNiO_3$ or any combination of $NdNiO_3$, $SmNiO_3$, $PrNiO_3$, $EuNiO_3$, $GdNiO_3$, wherein a refractive index of the electro-optical material is configured to be controlled by a hydrogen doping density.

10. The solid state optical beam steering device of claim 9 further including:
a first voltage source applied between a first end and a second end of the first resistive sheet for biasing the first resistive sheet in a first direction; and
a second voltage source applied between a first end and a second end of the second sheet-for biasing the second sheet in a second direction;
wherein the first end and the second end of the first transparent resistive sheet are opposite each other; and
wherein the first end and the second end of the second transparent resistive sheet are opposite each other.

11. The solid state optical beam steering device of claim 10 wherein the second direction is orthogonal to the first direction.

12. The solid state optical beam steering device of claim 10 wherein the first voltage source and the second voltage source are direct current (DC) voltages.

13. The solid state optical beam steering device of claim 10:
wherein the solid state optical beam steering device further comprises a third voltage source applied between the second end of the first transparent resistive sheet and the second end of the second sheet for adjusting an optical beam phase.

14. The solid state optical beam steering device of claim 9 wherein the solid state body of electro-optical material a rectilinear configuration, or a square configuration.

15. The solid state optical beam steering device of claim 9 further including a first voltage source applied between a first end and a second end of the first resistive sheet for biasing the first resistive sheet in a first direction.

16. A solid state optical beam steering device comprising:
an array of a plurality of optical beam steering elements;
wherein each optical beam steering element comprises:
a solid state body of electro-optical material wherein the solid state body of electro-optical material comprises any material of a class of hydrogen-doped phase-change metal oxide and wherein the solid state body has a first face and a second face opposite the first face;
a first transparent resistive sheet on a first face of the solid state body of electro-optical material, wherein the first transparent resistive sheet extends along the first face; and
a second transparent resistive sheet on a second face of the solid state body of electro-optical material, wherein the second transparent resistive sheet extends along the second face,
wherein an end of the first transparent resistive sheet and an end of the second transparent resistive are electrically connected to one another;
wherein the electro-optical material comprises $NdNiO_3$, $SmNiO_3$, $PrNiO_3$, $EuNiO_3$, $GdNiO_3$ or any combination of $NdNiO_3$, $SmNiO_3$, $PrNiO_3$, $EuNiO_3$, $GdNiO_3$, wherein a refractive index of the electro-optical material is configured to be controlled by a hydrogen doping density.

17. The solid state optical beam steering device of claim 16 wherein each optical beam steering element further comprises:
a first voltage source applied between a first end and a second end of the first transparent resistive sheet; and
a second voltage source applied between a first end and a second end of the second transparent resistive sheet;
wherein the first end and the second end of the first transparent resistive sheet are opposite each other;
wherein the first end and the second end of the second transparent resistive sheet are opposite each other;
wherein the first voltage source biases the first transparent resistive sheet in a first direction;
wherein the second voltage source biases the second transparent resistive sheet in a second direction; and
wherein the second direction is orthogonal to the first direction.

18. The solid state optical beam steering device of claim 17 wherein each optical beam steering element further comprises:
a third voltage source applied between the second end of the first transparent resistive sheet and the second end of the second transparent resistive sheet for adjusting an optical beam phase.

19. The solid state optical beam steering device of claim 18:
wherein when a variable gradient in the index of refraction of the solid state body of electro-optical material of each optical beam steering element is induced by varying either or both the first voltage source and the second voltage source, each optical beam steering element steers an input beam to form an output beam in a new direction, and combines an optical beamlet output of each optical beam steering element by adjusting the third voltage source of each respective optical beam steering element to cohere the optical beamlet output of each optical beam steering element to form a coherent output optical beam; or
wherein when a variable gradient in the index of refraction of the solid state body of electro-optical material of each optical beam steering element is induced by varying either or both the first voltage source and the second voltage source, each optical beam steering element steers an input beam to form multiple output beams each in a new direction, and combines an optical beamlet output of each optical beam steering element by adjusting the third voltage source of each respective optical beam steering element to cohere the optical beamlet output of each optical beam steering element to form multiple coherent output optical beams.

20. The solid state optical beam steering device of claim 17:
wherein when a variable gradient in the index of refraction of the solid state body of electro-optical material of each optical beam steering element is induced by varying either or both the first voltage source and the second voltage source, each optical beam steering element steers an input beam to form an output beam in a new direction; or
wherein when a variable gradient in the index of refraction of the solid state body of electro-optical material of each optical beam steering element is induced by varying either or both the first voltage source and the second voltage source, each optical beam steering element steers an input beam to form multiple output beams each in a new direction.

21. A method of providing optical beam steering comprising:
providing a solid state body of electro-optical material wherein the solid state body of electro-optical material comprises a material of a class of hydrogen-doped phase-change metal oxide and wherein the solid state body has a first face and a second face opposite the first face;
providing a conductor on the first face of the solid state body of electro optic material;
providing a resistive sheet adjacent the second face of the solid state body of electro optic material, wherein the resistive sheet has a first side and a second side; and
wherein the conductor is electrically connected to the second side of the first resistive sheet;
wherein the electro-optical material comprises $NdNiO_3$, $SmNiO_3$, $PrNiO_3$, $EuNiO_3$, $GdNiO_3$ or any combination of $NdNiO_3$, $SmNiO_3$, $PrNiO_3$, $EuNiO_3$, $GdNiO_3$, wherein a refractive index of the electro-optical material is configured to be controlled by a hydrogen doping density.

22. The method of claim 21 further comprising:
providing a mirror on the second face of the solid state body of electro optic material.

23. The method of claim 21 further comprising:
applying a voltage between the first side of the first transparent resistive sheet and the transparent conductor to apply a voltage bias across the first transparent resistive sheet.

24. A method of providing two dimensional optical beam steering comprising:
providing a solid state body of electro-optical material wherein the solid state body of electro-optical material comprises a material of a class of hydrogen-doped phase-change metal oxide and wherein the solid state body has a first face and a second face opposite the first face;
providing a first resistive sheet on a first face of the solid state body of electro-optical material, wherein the first resistive sheet extends along the first face; and
providing a second sheet on a second face of the solid state body of electro-optical material, wherein the second sheet extends along the second face;
wherein an end of the first resistive sheet and an end of the second sheet are electrically connected to one another; and
wherein the electro-optical material comprises $NdNiO_3$, $SmNiO_3$, $PrNiO_3$, $EuNiO_3$, $GdNiO_3$ or any combination of $NdNiO_3$, $SmNiO_3$, $PrNiO_3$, $EuNiO_3$, $GdNiO_3$, wherein a refractive index of the electro-optical material is configured to be controlled by a hydrogen doping density.

25. The method of claim 24 further comprising:
applying a first voltage between a first end and a second end of the first resistive sheet; and
applying a second voltage between a first end and a second end of the second sheet;
wherein the first end and the second end of the first transparent resistive sheet are opposite each other;
wherein the first end and the second end of the second sheet are opposite each other;
wherein the first voltage biases the first transparent resistive sheet in a first direction;
wherein the second voltage biases the second transparent resistive sheet in a second direction; and
wherein the second direction is orthogonal to the first direction.

26. The method of claim 25 further comprising:
    applying a third voltage between the second end of the first transparent resistive sheet and the second end of the second sheet for adjusting an optical beam phase.

* * * * *